2,807,574

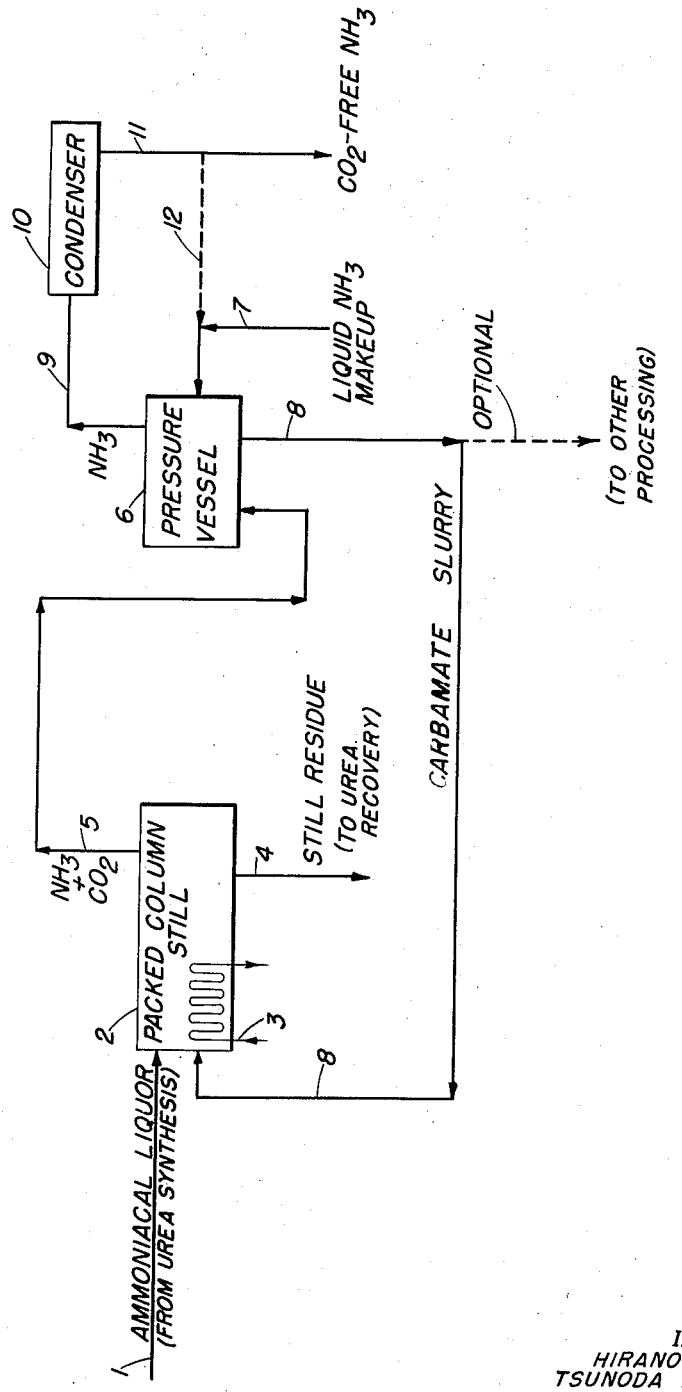

TREATMENT OF UNREACTED AMMONIA IN THE MANUFACTURE OF UREA

Masao Hirano and Makoto Tsunoda, Otsu, Kaneko, Niihama-shi, Japan

Application October 21, 1953, Serial No. 387,534

6 Claims. (Cl. 202—51)

This invention relates to the recovery of ammonia, and more particularly it relates to the recovery of ammonia from a solution containing ammonia and carbon dioxide.

It is well known that in the synthesis of urea from the reaction of ammonia and carbon dioxide under elevated temperature and pressure, the reaction efficiency is improved if the ammonia is present in large excess. This excess makes it necessary that the unreacted excess ammonia be recovered, usually for recirculation to the synthesis autoclave. However, the recovery of the excess ammonia from the solution has been fraught with difficulties. Since the carbon dioxide and the ammonia combine to form ammonium carbamate a serious problem of blockage of the separating apparatus has been encountered. It would be desirable to recover large amounts of ammonia in which the carbon dioxide content has been reduced to below several parts per million. At the same time, it is desirable that only a small portion of the available ammonia be lost in the formation of various salts.

Although straight rectification has most often been used in the past in attempts to recover the ammonia, the blockage of the rectification tower by ammonia carbamate formation has presented serious difficulties.

It is an object of this invention to overcome the deficiencies in ammonia recovery that exist in the prior art.

This object has been accomplished in a simple and effective manner. A solution containing ammonia and carbon dioxide, along with any urea and other by-products, is passed into a distillation column in order that ammonia, carbon dioxide, and some water vapor may be removed as gases. The gases are then removed from the distillation column and passed through a bath of liquid ammonia. The liquid ammonia reacts with the carbon dioxide in the column off-gases and precipitates the carbon dioxide as solid ammonium carbamate. Most of the ammonia in the column off-gases passes on through the liquid ammonia bath and can be recovered as substantially pure ammonia gas containing less than about 6 parts per million of carbon dioxide. The liquid ammonia containing the solid ammonium carbamate may be recycled to the distillation column if desired. The column bottoms pass out of the column containing substantially all of the carbon dioxide that entered the column in the feed.

The present invention teaches the recovery of substantially pure ammonia by combining the distillation operation with a washing operation, both operations being carried out as separate steps.

The invention may be readily illustrated in treating the liquor resulting from urea synthesis in an autoclave, such a process being shown in the accompanying drawing which is a flow diagram thereof.

This liquor is passed under pressure through a suitable conduit 1 into a distillation column 2 which usually contains packing such as Rashig rings or the like. A conventional heating coil 3 at the bottom of the column supplies the necessary heat for distillation. Still residue, comprising the urea, water, ammonium carbamate, residual ammonia and residual carbon dioxide, leaves the bottom of distillation column 2 through a suitable outlet conduit 4 at the bottom of the column.

There is little danger of blockage of the column because of the high temperature and also because of the washing effect of the incoming feed. The gaseous ammonia and carbon dioxide will not react in the column to form ammonium carbamate. Consequently, a simple, packed, distillation column is sufficient to accomplish the purpose as far as this step is concerned. The gas evaporated from the column contains several percent carbon dioxide, most of which must be eliminated. It is in this elimination, in conjunction with the distillation, that the prior art has run into difficulties with ammonium carbamate formation.

Off-gases comprising ammonia and carbon dioxide, according to the present invention are removed from the top of column 2 through a suitable conduit 5 and passed into another pressure vessel 6 containing liquid ammonia which may be introduced from any desirable source through conduit 8. The off-gases from the column are blown in bubble form through the liquid ammonia in the separate vessel 6. Thus the carbon dioxide in the off-gases is combined with liquid ammonia to produce solid ammonium carbamate, when condensed on the surface of a solid, makes a very hard shell, but as it is condensed herein liquid ammonia it forms minute floating particles in the form of a slurry and thus there is no danger of blockage. This ammonium carbamate-liquid ammonia slurry is withdrawn through conduit 8 and may be sent back to the distillation column 2 where it is vaporized. Alternatively it may be sent to other processing, as for example, in making more urea. Both the column 2 and the separate pressure vessel 6 are maintained under a pressure of about 10–30 atmospheres, preferably about 10 to 20.

The ammonia gas, free from substantially all of the carbon dioxide, is removed from the top of pressure vessel 6 as through conduit 9 and a conventional condenser 10 and conduit 11. Resultant liquid ammonia is thereby available for further use. If so desired a part of it may be returned to vessel 6 through optional conduit 12 and conduit 8.

Thus the method of the present invention loses very little ammonia to salt or carbamate formation and at the same time produces an ammonia gas of high purity. Furthermore, one of the outstanding advantages of the present process is the simple and economical separation method employed. In addition, the present process largely eliminates many of the corrosion problems encountered in the prior art processes.

The following example illustrates the invention:

Ammonia and carbon dioxide in a mole ratio of 6:1 was charged to a urea synthesis autoclave. About 77% of the carbon dioxide was converted to urea. The resulting reaction liquid had the following composition as discharged from the autoclave:

|  | Kg./hr. | Percent |
|---|---|---|
| Urea | 7.80 | 31.6 |
| Water | 2.34 | 9.6 |
| Ammonia | 12.82 | 15.9 |
| Carbon dioxide | 1.71 | 6.9 |
| Total | 24.67 | 100.0 |

This liquid was fed into a packed column under a pressure of 12 atmospheres and having a bottoms temperature of 110° C. The off-gases were bubbled through a bath of liquid ammonia in a separate pressure vessel under a pressure of 12 atmospheres at a temperature of 33° C. Liquid ammonia at the rate of 2.8 kilograms per hour was pumped into the pressure vessel.

As a result, ammonia gas containing 2 parts per million of carbon dioxide was obtained from the top of the pressure vessel at the rate of 14.3 kilograms per hour, of which the net separation of ammonia was computed as 11.33 kilograms per hour after deducting the above-mentioned 2.8 kilograms per hour that was fed to the pressure vessel as liquid ammonia.

The liquid removed from the bottom of the distillation column had the following composition:

|  | Kg./hr. |
|---|---|
| Urea | 7.80 |
| Water | 2.33 |
| Ammonia | 1.49 |
| Carbon dioxide | 1.71 |
| Total | 13.33 |

We claim:

1. In the recovery of substantially carbon-dioxide-free ammonia from aqueous solutions containing ammonia and carbon dioxide in mol ratios greater than unity, the improved process which comprises: at a pressure of from about 10 to about 30 atmospheres, heating a mass of said solution sufficiently to obtain an off gas mixture comprising essentially ammonia and carbon dioxide; collecting said off-gas mixture; and in a separate vessel passing collected off-gases into a body of liquid ammonia maintained under a pressure of from about 10 to about 30 atmospheres, converting the carbon dioxide by said step into small discrete particles of ammonium carbamate suspended in said liquid ammonia, liberating carbon dioxide-free ammonia gas from said body of liquid ammonia in greater volume than is passed into said body, and recovering so-obtained ammonia gas.

2. A process according to claim 1 in which heated liquor is removed from said mass of solution at a substantially constant rate and additional solution to be heated is fed thereto at a rate sufficient to maintain said mass at substantially constant volume.

3. A process according to claim 1 in which the mass of solution is heated at about 110° C., the body of liquid ammonia is maintained at about 33° C. and both operations are carried out under about 12 atmospheres pressure.

4. A process according to claim 1 in which liquid ammonia containing suspended ammonium carbamate is withdrawn from said body of liquid ammonia at a substantially constant rate and carbon dioxide-free ammonia is added thereto to a rate sufficient to maintain said body at substantially constant volume.

5. A process according to claim 3 in which withdrawn liquid-ammonia carbamate slurry is added as material to be treated to said mass of solution being heated.

6. A process according to claim 3 in which said carbon-dioxide free ammonia gas is condensed, at least a part thereof, is returned added to said body of liquid ammonia as condensate.

References Cited in the file of this patent

UNITED STATES PATENTS

| Re. 10,725 | Hendrick | May 18, 1886 |
| 515,909 | Frasch | Mar. 6, 1894 |
| 1,012,272 | Pennock et al. | Dec. 19, 1911 |
| 1,429,483 | Bosch et al. | Sept. 19, 1922 |
| 1,898,093 | Miller | Feb. 21, 1933 |
| 1,908,715 | Miller | May 16, 1933 |
| 1,923,489 | Krase et al. | Aug. 22, 1933 |
| 1,967,717 | Moeller | July 24, 1934 |
| 2,214,068 | Rogers et al. | Sept. 10, 1940 |
| 2,519,451 | Fulton | Aug. 22, 1950 |
| 2,634,826 | Cramer | Apr. 14, 1953 |